(12) United States Patent
Yeh

(10) Patent No.: US 6,749,385 B2
(45) Date of Patent: Jun. 15, 2004

(54) NAIL STRUCTURE

(76) Inventor: Ming-Tien Yeh, 235 Chung - Ho Box 8-24, Taipei (TW)

( * ) Notice: Subject to any disclaimer, the term of this patent is extended or adjusted under 35 U.S.C. 154(b) by 0 days.

(21) Appl. No.: 10/228,749

(22) Filed: Aug. 27, 2002

(65) Prior Publication Data

US 2004/0042867 A1 Mar. 4, 2004

(51) Int. Cl.⁷ .................................. F16B 13/06
(52) U.S. Cl. .................. 411/45; 411/59; 411/60.1; 411/448
(58) Field of Search ................. 411/41, 45, 46, 411/48, 59, 60.1, 447, 448

(56) References Cited

U.S. PATENT DOCUMENTS

| | | | | |
|---|---|---|---|---|
| 734,326 A | * | 7/1903 | Hicks | 411/59 |
| 4,871,289 A | * | 10/1989 | Choiniere | 411/41 X |
| 5,221,167 A | * | 6/1993 | Girkin et al. | 411/45 |
| 5,575,600 A | * | 11/1996 | Giannuzzi et al. | 411/45 X |

* cited by examiner

*Primary Examiner*—Neill Wilson

(57) ABSTRACT

A nail structure comprises a wall nail casing a center of the wall nail casing being formed with a tapered central axial hole which is reduced toward a distal end thereof; two sides of the distal end of the wall nail casing being formed with respective slots; and one end of the central axial hole being an through opening and another end thereof being an inlet; a hammer nail capable of inserting into the central axial hole; and a plurality of semi-round enhancing ribs are on an inner surface of the central axial hole of the wall nail casing; a front end of each enhancing rib being reduced toward one inlet of the central axial hole for receiving the hammer nail easily.

2 Claims, 4 Drawing Sheets

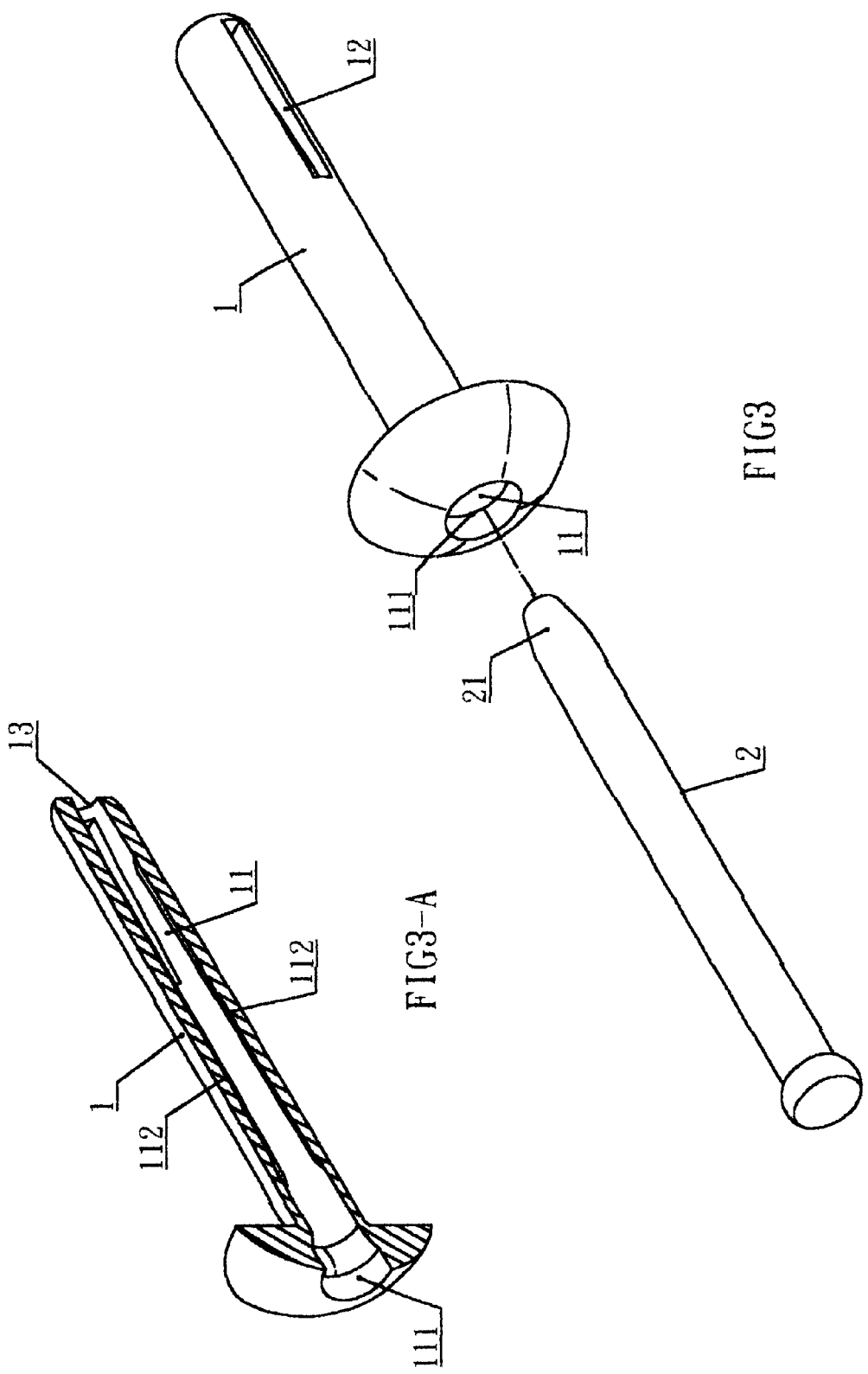

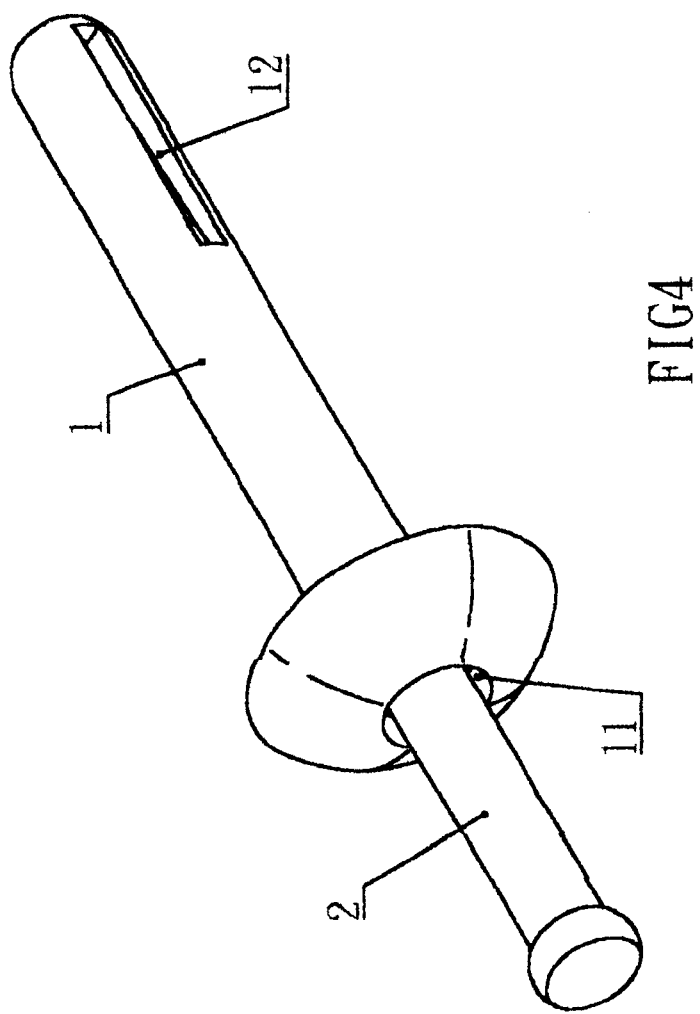

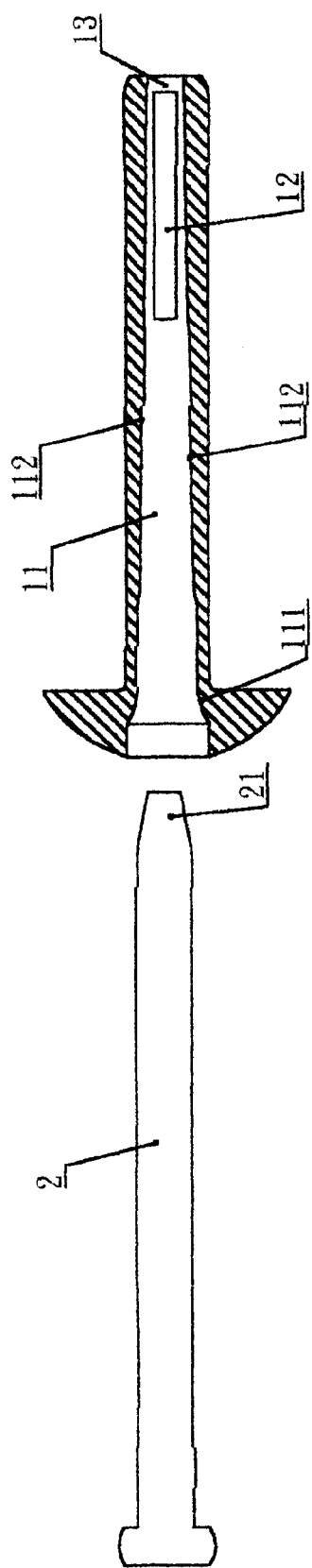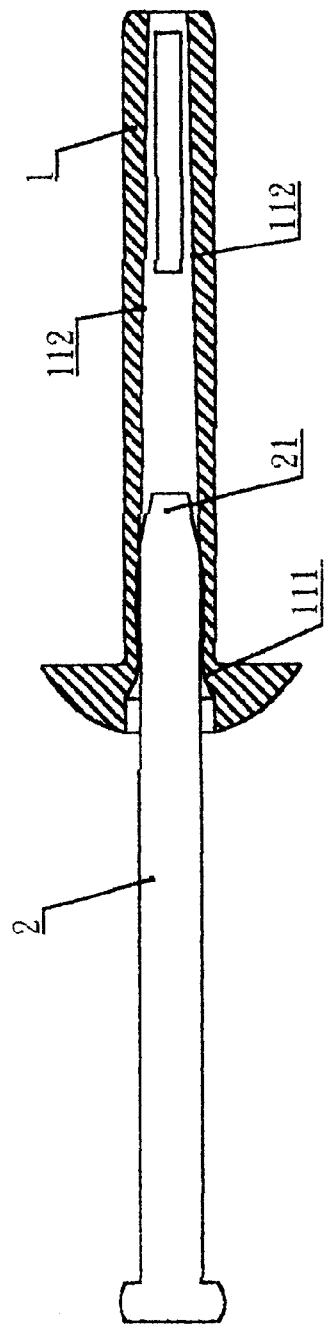

NAIL STRUCTURE

FIELD OF THE INVENTION

The present invention relates to nail structures, and particularly to a nail structure having a wall nail casing and a hammer nail, wherein when the hammer nail is beaten into a central axial hole of the wall nail casing, the hammer nail expands the central axial hole outwards to prevent the hammer nail from colliding the distal end of the wall nail casing.

BACKGROUND OF THE INVENTION

Referring to FIGS. 1 and 2, a prior art nail structure is illustrated. In using, a wall nail casing 3 is fixed to a wall and a hammer nail 4 is beaten into the wall nail casing 3. A center of the wall nail casing 3 is formed with a tapered central axial hole 31 which is reduced to one distal end thereof far way from an inlet of the hammer nail 4. When the hammer nail 4 is beaten into the central axial hole 31, the hammer nail 4 will expand the central axial hole 31 of the wall nail casing 3 so as to be embedded into the central axial hole 31. However, this prior art wall nail casing has the following disadvantages:

The central point can not be corrected: In manufacturing the wall nail casing 3, in the mold of the manufacturing the wall nail casing, a coaxial pin shorter than the length of the wall nail casing is inserted into the mold. When forming the wall nail casing, since the wall nail casing is a long tube, as pressing the wall nail casing, an overlarge pressure on the central axial hole 31 will shift the coaxial pin when the coaxial pin is tilt so that the central axial hole of the wall nail casing can not be aligned to the central axis itself. Thereby, the hammer nail is buckled in the inner side of the wall nail casing, and thus it is unsuccessful to beat the hammer nail into the wall nail casing, as illustrated in FIG. 2.

The hammer nail easily deforms. This is because in the prior art, only one coaxial pin is inserted into the wall nail casing 3, and the pin is shorted than the wall nail casing. Thus the distal end 32 of the wall nail casing is closed. When the hammer nail 4 applies a force to the wall nail casing 3 so that the outer side of the hammer nail 4 is extruded into the central axial hole 31. Since the distal end 32 is closed, the expanding force is non-uniform and therefore, and the push force is insufficient. It becomes difficult to expand the central axial hole 31 of the wall nail casing. Thereby, it is easy that the tip of the hammer nail 4 will deform as it is beaten into the wall nail casing. Thus the hammer nail 4 provides an insufficient push force and thus the function thereof is reduced.

The edge of the hammer nail 4 is not smooth, and the tip 41 of the prior art hammer nail 4 is not smooth and thus is formed because an uneven edge 411 will rub the inner edge of the wall nail casing. Thereby, the outer diameter of the wall nail casing becomes coarse and cannot be inserted into the wall.

SUMMARY OF THE INVENTION

Accordingly the primary object of the present invention is to provide nail structure which comprises a wall nail casing a center of the wall nail casing being formed with a tapered central axial hole which is reduced toward a distal end thereof; two sides of the distal end of the wall nail casing being formed with respective slots; and one end of the central axial hole being an through opening and another end thereof being an inlet; a hammer nail capable of inserting into the central axial hole; and a plurality of semi-round enhancing ribs are on an inner surface of the central axial hole of the wall nail casing; a front end of each enhancing rib being reduced toward one inlet of the central axial hole for receiving the hammer nail easily.

The various objects and advantages of the present invention will be more readily understood from the following detailed description when read in conjunction with the appended drawing.

BRIEF DESCRIPTION OF THE DRAWINGS

FIG. 3 is an exploded perspective view of the present invention.

FIG. 3A is a cross section view of the wall nail casing of the present invention.

FIG. 4 is an assembled view of the present invention.

FIG. 5 is an assembled perspective view of the present invention.

FIG. 6 is a plane assembled view of the wall nail casing of the present invention.

DETAILED DESCRIPTION OF THE PREFERRED EMBODIMENTS

Figure 1:
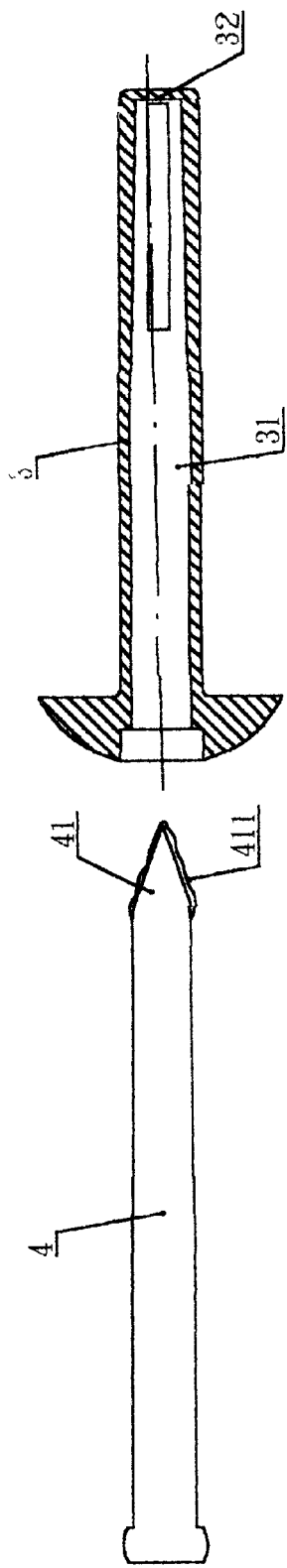
FIG. 1 is a plane exploded perspective view of a prior art wall nail casing.
Figure 2:
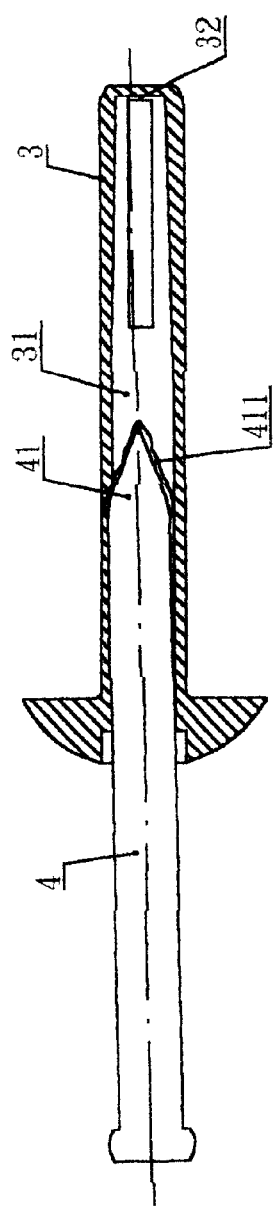
FIG. 2 is a plane assembled view of the prior art wall nail casing.

Referring to FIGS. 3 and 4, the structure of the present invention is illustrated. The present invention is formed by a wall nail casing 1 and a hammer nail 2 which is beaten into the wall nail casing 1.

A center of the wall nail casing 1 is formed with a tapered central axial hole 11. Each of two sides of the distal end of the wall nail casing 1 is formed with a respective slot 12. In manufacturing the wall nail casing 1, an interior and a distal end of the mold are installed with coaxial pins. When the wall nail casing 1 is formed, two ends of the nail body are supported by coaxial pins so that the central axial hole 11 will not shift. Thereby, the central axial hole 11 of the wall nail casing 1 can correct the central axis itself. When the wall nail casing 1 is formed, the distal end thereof is exactly formed with a though opening 13 communicated with the central axial hole 11 so that the whole wall nail casing 1 is hollowed and the distal end is formed as a round inner tapered hole.

A front edge of the central axial hole 11 of the wall nail casing 1 is a round tapered inlet 111. A distal end 21 of the hammer nail 2 has a round tapered shape. Thereby, the hammer nail 2 can successfully pass through the inlet 111 of the wall nail casing 1.

An inner surface of the central axial hole 11 of the wall nail casing 1 is formed with a plurality of semi-round enhancing ribs 112. A front end of each enhancing rib 112 is reduced toward the inlet of the central axial hole 11. Thereby, the hammer nail 2 can be placed therein successfully. Therefore, the hammer nail 2 is positioned at the inlet 111 of the wall nail casing 1. The distal end of the wall nail casing 1 is not expanded by the hammer nail 2. Thus the hammer nail 2 and wall nail casing 1 are inserted into a drill hole of a wall. The function of the enhancing ribs 112 causes that the hammer nail 2 will not break the wall of the hammer nail 2.

Thereby, when a force is applied to the hammer nail 2, hammer nail 2 is beaten into the central axial hole 11 of the wall nail casing 1. Since the whole wall nail casing 1 is hollowed, the hammer nail 2 can expand the central axial hole 11 outwards to prevent the hammer nail 2 from colliding the distal end of the wall nail casing 1 when the distal end of the wall nail casing 1 is not expanded outwards. Thus, the hammer nail 2 is aligned to a center point to prevent the deformation of the hammer nail 2.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A nail structure comprising;

a wall nail casing, a center of the wall nail casing being formed with a tapered central axial hole which is reduced toward an inlet; two sides of the distal end of the wall nail casing being formed with respective slots; and one end of the tapered central axial hole being an through opening and another end thereof being the inlet;

a hammer nail capable of inserting into the tapered central axial hole from the inlet of the tapered central axial hole and a plurality of ribs being formed on an inner surface of the tapered central axial hole of the wall nail casing; a front end of each rib being reduced toward the inlet of the central axial hole for receiving the hammer nail easily.

2. The nail structure as claim in claim 1, wherein the inlet is a round tapered inlet; a distal end of the hammer nail has a round tapered shape corresponding to the round tapered inlet.

* * * * *